Jan. 11, 1949.  J. KOGEL  2,458,860
SCANNING LENS WITH MOUNTING MEANS FOR SOUND PROJECTORS
Filed April 19, 1946
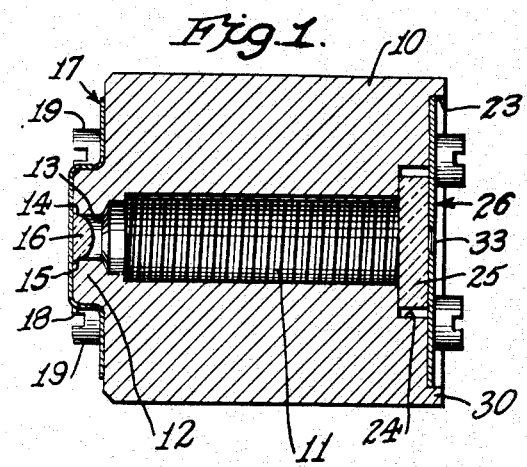
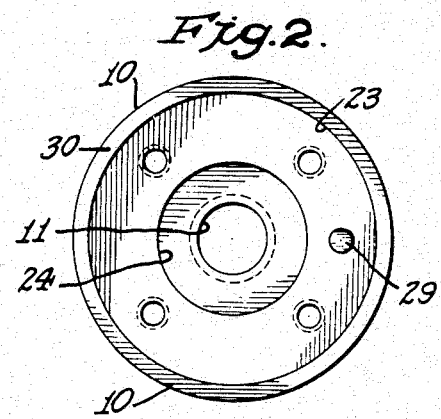
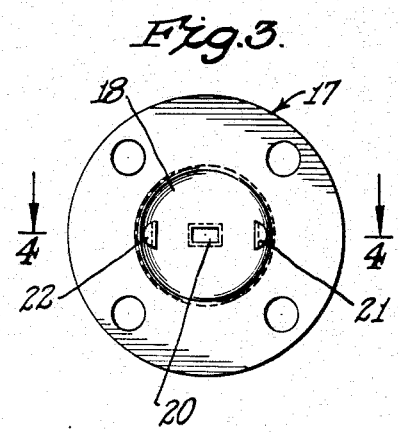
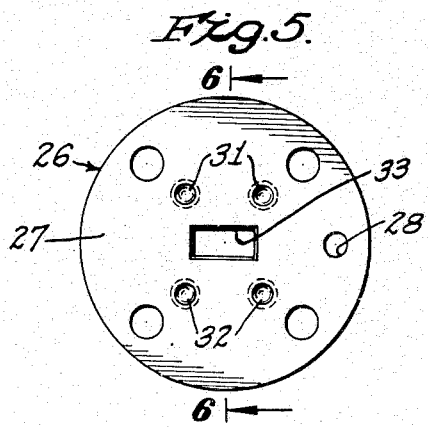
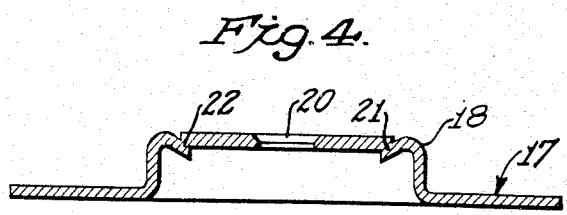
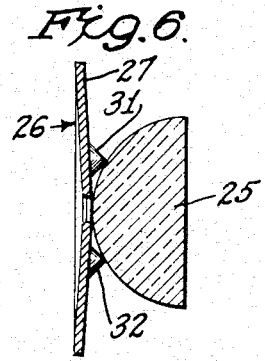
INVENTOR.
JOHN KOGEL
BY
Campbell, Brumbaugh & Free
his ATTORNEY Patented Jan. 11, 1949

2,458,860

UNITED STATES PATENT OFFICE 2,458,860

SCANNING LENS WITH MOUNTING MEANS FOR SOUND PROJECTORS

John Kogel, Malverne Park, Long Island, N. Y., assignor to Kollmorgen Optical Corporation, Brooklyn, N. Y., a corporation of New York Application April 19, 1946, Serial No. 663,283

5 Claims. (Cl. 88—24).

This invention relates to lens assemblies, and it relates particularly to improvements in scanning lenses for projectors for moving picture films having a sound track thereon and to other related devices.

The scanning lenses used in devices of the type referred to above, usually include a lens barrel or tube in which are mounted a pair of cylindrical lenses, actually half or semi-cylindrical lenses, with the axes of the lenses at right angles to each other and to the axis of the lens tube.

The shape of the lenses make them difficult to retain in position and even more difficult to adjust into the above referred to right angular relationship. Seats for the lenses can be machined in the lens tube which will position the lenses precisely, but the machining of the seats and the fitting of the lenses to such seats are expensive and time-consuming.

An object of the present invention is to provide scanning lenses that may be assembled readily and accurately.

Another object of the invention is to provide scanning lenses in which precision machining of the lens tube and the difficulty encountered in fitting the lenses to the tube are reduced to a minimum.

Other objects of the invention will become apparent from the following description of a typical scanning lens embodying the present invention.

In accordance with the invention, a scanning lens is provided in which the semi-cylindrical lenses are disposed adjacent the ends of the lens tube and are positioned by means of retainers and cooperating positioning means on the lens tube in an accurate predetermined relationship. More particularly, at least one of the retainers may be provided with projections that engage the associated lens and locate the lens accurately with respect to the retainer, the latter being positioned in a predetermined accurate relationship to the lens tube by cooperating positioning means on the retainer and the lens tube.

In a preferred form of lens assembly, two semi-cylindrical lenses are mounted at opposite ends of the lens tube with their convex surfaces facing in the same direction and their flat surfaces facing in the opposite direction. One of the lenses is received in a recess having inwardly converging walls which engage the convex surfaces of the lens tangentially and thereby hold it against lateral shifting movement and also position the axis of the lens in a predetermined plane perpendicular to the axis of the lens tube. This lens is engaged by a retaining member which engages the flat surface of the lens and prevents it from tilting in the recess. This retaining member or plate may be provided with inwardly extending projections for engaging the ends of the lens to prevent it from shifting endwise.

The semi-cylindrical lens in the opposite end of the tube is positioned with its flat surface in contact with the bottom of a recess in the lens tube, the bottom of the recess being disposed in a plane perpendicular to the axis of the tube. The lens is further positioned by means of a retaining plate which has a series of projections thereon that engage the convex surface of the lens and thereby hold it in a predetermined angular relationship with respect to the retaining plate. The retaining plate is maintained in a fixed relationship with respect to the lens tube by means of a pin-and-recess connection on the tube and plate which are accurately related to the axis of the first lens member so that the two lenses are adjusted and positioned with their axes in right angular relationship to each other and to the axis of the lens tube.

The above described construction makes it unnecessary to fit the lenses precisely in recesses in the ends of the lens tube inasmuch as the projections on the retainers control the angular relationship of the lens elements. Therefore, precision machining of the lens tube with the exception of a relatively small number of surfaces is unnecessary and the lenses may be assembled with the lens tube much more quickly and with equally as great accuracy as the scanning lenses provided heretofore.

For a better understanding of the present invention, reference may be had to the accompanying drawings in which:

Figure 1 is a view in longitudinal section of a typical scanning lens assembly embodying the present invention;

Figure 2 is an end view of the scanning lens assembly with the end retainer thereof removed;

Figure 3 is a plan view of a retainer for one of the lenses of the scanning lens assembly;

Figure 4 is a view in section taken on line 4—4, shown in somewhat enlarged form to disclose details thereof;

Figure 5 is a plan view of the retainer for the lens at the opposite end of the lens tube; and Figure 6 is a view in section taken on line 6—6 of Figure 5.

As shown in Figure 1, the lens tube 10 may consist of a generally cylindrical member formed of metal, plastic, or other material having a central bore 11 therein which may be internally threaded and coated with a dull black paint or the like in order to reduce light reflections therein. At the left hand end of the lens tube 10 is a generally circular projection 12 which is provided with a diametrical slot 13 communicating with the bore or passage 11. The slot 13 can be formed by sawing or milling the projection 12 from edge to edge.

The opposed edges 14 and 15 of the slot 13 are bevelled or tapered in order to engage tangentially the convex surface of a semi-cylindrical lens member 16 which is disposed within the slot, and act to position the lens 16 with its axis perpendicular to the axis of the tube 10 and its base in a plane perpendicular to the axis of the tube 10. The lens 16 may be retained in this position by means of a retaining member 17 which, as best shown in Figures 3 and 4, is of circular configuration and has a raised or displaced midportion 18. The portion 18 is adapted to fit over the projection 12 with the outer peripheral edge portion of the member 17 lying against the end of the tube 10 where it is retained by means of a plurality of screws 19.

The member 17 is provided with a rectangular opening or aperture 20 in its center and has downwardly punched projections 21 and 22 which engage the ends of the cylindrical lens 16 and prevent it from shifting endwise. In this way, the lens element 16 is retained firmly in position with its midportion on the axis of the lens tube and with its base and its axis perpendicular to the axis of the tube 10.

The opposite end of the lens tube 10 is provided with a shallow annular recess 23 and a deeper circular recess 24 in the midportion of the annular recess 23. The second cylindrical lens member 25 is disposed in the recess 24 and must be positioned so that its axis will be at a right angle to the axis of the tube 10 and the axis of the lens 16. Such positioning is accomplished in part by milling or otherwise machining the bottom of the recess 24 so that it lies in a plane perpendicular to the axis of the tube 10, whereby the flat surface of the lens element 25, as shown in Figure 6, will engage the bottom of the recess 24 and will be perpendicular to the axis of the tube 10.

The lens 25 is further positioned by means of the retaining member 26 which consists of a disk-like plate 27 that is either flat transversely or slightly dished, as shown in Figure 6. The disk 27 is provided with an aperture 28 which receives a pin 29 fixed to the end of the lens tube 10. The pin 29 preferably is arranged on a radius from the axis of the tube which is parallel with the axis of the lens 16. However, any other angular relationship between the radius on which the pin falls and the axis of the lens 16 may be selected, if desired.

When the plate 27 is placed within the rim 30 of the lens tube and with the aperture 28 receiving the pin 29, the retaining plate 27 is in a fixed and accurate angular relationship to the lens tube. The lens element 25 then can be positioned with its axis in right angular relationship to the axis of the lens 16 by means of two pairs of projections 31 and 32 on the inner surface of the retainer 27. The two pairs of projections 31 and 32 engage the convex surface of the lens 25 and retain it in fixed angular relationship to the aperture 28 which receives the locating pin 29. Thus, by suitably locating the projections 31 and 32, the lens 25 can be so disposed that its axis extends at a right angle to the axis of the lens 16 and to the axis of the tube 10. The retainer 27 is provided with a central aperture 33 for passage of the scanning beam.

The above described construction does not require apertures or recesses in the ends of the lens tube 10 which precisely fit the lenses 16 and 25 or which are in accurately related angular relationship. The only surfaces of the lens tube that must be machined within close tolerances are the surfaces 14 and 15 and the bottom of the recess 24. Accordingly, the lens tube can be prepared much more easily than the tubes used heretofore without adversely affecting the required accurate relationship between the lenses mounted therein.

It will be understood that the lens tube may be modified considerably in its dimensions and shape and the material used therein and that the retaining members may also be modified in shape and size without departing from the invention. Therefore, the form of lens described above should be considered as illustrative of the invention and not as limiting the scope of the following claims.

I claim:

1. A scanning lens comprising a tube having recesses in its opposite ends, said recesses being in substantially right angular relationship to the axis of said tube, a first semi-cylindrical lens in one of said recesses having an outwardly facing flat surface, a first member detachably mounted on one end of said tube for engagement with said flat surface to retain said first lens in said recess in a predetermined position, a second semi-cylindrical lens in the other recess having an inwardly facing flat surface and an outwardly facing convex surface, a second member detachably connected to the other end of said tube, means on said tube and said second member for positioning said second member in a predetermined relationship to the axis of said first lens, and projections on said second member engaging the convex surface of said second lens to position said second lens relative to said second member so that the axes of said lenses are perpendicular to each other and to the axis of said tube.

2. A scanning lens comprising a lens tube having recesses at its opposite ends and an opening through said tube connecting said recesses, one of said recesses having inwardly converging side walls and the other having a flat bottom, a first semi-cylindrical lens having a convex surface in contact with said converging side walls and a flat outer surface, a plate detachably secured to said tube engaging said flat surface of said first lens to retain it in its recess with its axis perpendicular to the axis of said tube and in a plane parallel with the flat bottom of said other recess, a second semi-cylindrical lens in said other recess having a flat surface engaging said flat bottom and an outwardly extending convex surface, a retaining plate having inwardly extending projections engageable with said convex surface of said second lens for positioning said lens with respect to said retaining plate, and a cooperating pin and recess on said retaining plate and tube in accurate predetermined relationship to the axis of said first lens and said projections for positioning said second lens with its axis normal to the axes of said first lens and said tube.

3. A scanning lens comprising a lens tube, a first semi-cylindrical lens mounted in one end of said tube with its axis perpendicular to the axis of said tube, a second semi-cylindrical lens having a convex surface facing outwardly in the opposite end of said tube and adjustable angularly about the axis of said tube, a retaining member for said second lens secured to an end of said tube, projections on said retaining member for engaging said convex surface to position said second lens accurately with relation to said retaining member, and a cooperating pin and recess on said tube and said member for positioning said member in predetermined angular relationship to the axes of said tube and said first lens.

4. A lens mount comprising a tubular member having a circular recess in one end thereof, said recess having a flat bottom, a semi-cylindrical lens in and movable relatively to said recess having a flat surface adjacent to said bottom and an outwardly directed convex surface, an apertured retaining plate overlying said recess, projections on said plate engaging said convex surface to position said lens with respect to said plate, and cooperating means on said plate and member for orienting said plate in a predetermined relation to said member.

5. A lens mount comprising a lens-supporting member having a flat lens seat, a semi-cylindrical lens having a flat surface and a semi-cylindrical surface fitting loosely in said lens supporting member with said flat surface engaging said seat, a retaining member having an aperture therein overlying said lens, projections in said retaining member engaging said semi-cylindrical surface for orienting said lens with respect to said retaining member and means on said retaining member and said lens-supporting member for orienting said members.

JOHN KOGEL.

REFERENCES CITED

The following references are of record in the file of this patent:

UNITED STATES PATENTS

| Number | Name | Date |
| --- | --- | --- |
| 1,935,300 | Smythe | Nov. 14, 1933 |
| 1,958,996 | Hansen et al. | May 15, 1934 |
| 2,019,152 | Maurer | Oct. 29, 1935 |
| 2,141,317 | Sabel | Dec. 27, 1938 |
| 2,164,747 | Landis | July 4, 1939 |
| 2,196,583 | Collins | Apr. 9, 1940 |